United States Patent
Touba

[15] 3,650,763
[45] Mar. 21, 1972

[54] HIGH PRESSURE PROCESS FOR MAKING PUFFED FOOD PRODUCT AND PRODUCT

[72] Inventor: Ali R. Touba, Crystal, Minn.
[73] Assignee: General Mills, Inc.
[22] Filed: Mar. 26, 1969
[21] Appl. No.: 810,777

[52] U.S. Cl. ..................................................99/82, 99/98
[51] Int. Cl. ..........................................A23l 1/18, A23l 1/20
[58] Field of Search ......................99/82, 83, 90 HD, 98, 80

[56] References Cited

UNITED STATES PATENTS 2,478,438   8/1949   Thompson et al. .......................99/82
2,824,806   2/1958   Matz..........................................99/83

Primary Examiner—Raymond N. Jones
Assistant Examiner—William A. Simons
Attorney—Anthony A. Juettner, William C. Babcock and Harold D. Jastram

[57] ABSTRACT

The process for producing a puffed food product from raw material such as legumes and cereal grains by subject the raw food product to high pressures and temperatures to cement and puff individual grains together to form a wafer-like product having low crumb characteristics and crunchy texture.

7 Claims, No Drawings

HIGH PRESSURE PROCESS FOR MAKING PUFFED FOOD PRODUCT AND PRODUCT

The invention relates to the production of puffed edible food products from raw material such as legumes and cereal grains.

Raw food products, such as cereal grains and legumes, are typically processed in the food industry to make the raw material more edible by puffing the products and cooking them in one manner or another to thereby improve their "chewability," texture, flavor, and appearance. These food seeds are characteristically very hard and therefore must be processed in some fashion to permit them to be eaten more readily.

Typically food products, such as noted above, are processed by soaking, grinding, cooking, mixing and similar steps after which the products are cooked, toasted, puffed, sheeted or otherwise baked to develop flavor. These various steps are usually taken in order to arrive at one or more desired end products such as puffed breakfast cereals, cookies, biscuits and the like. For instance, in the cereal industry, frequently whole kernels of grain are individually puffed to permit them to be used as a ready-to-eat breakfast cereal. Typically before the individual grains can be puffed, they must be soaked and otherwise prepared for the puffing operation, after which they are toasted and flavored. Likewise, in the baking industry, these same cereal grains or legumes are first ground to a fine consistency. This grinding obviously is a step to improve the "chewability" of the product. After the grinding, the product is then frequently mixed with one or more other ingredients or mixed with water in order to produce an end product by baking to develop flavor. It can be seen that all of these methods have involved a number of individual steps which must be carried out in a predetermined order thus requiring the expenditure of a great deal of time and effort to produce a chewable, consumable product.

The present process may be utilized to produce a new product which eliminates many of the usual time consuming, expensive steps practiced in the food industry. The process involves placing either whole grain or large granulations thereof between mechanical plates which subject the raw food product to high mechanical pressures together with a simultaneous application of high temperatures to the product. The mechanical pressures are released very suddenly to cause expansion of the raw material which causes the individual particles (either whole seeds or large granulations thereof), to expand and become cemented to form a wafer of puffed food product having a toasted flavor.

The product formed according to the above noted process takes on the appearance of a mosaic pattern which is predetermined by the size and shape of the seeds or parts thereof which are used in the processing. The natural ingredients of the raw material provides the cementing ingredient for producing a wafer of puffed food product which takes on a toasted flavor as a result of the application of high temperatures during the puffing and cementing operation. The finished product also is crunchy and virtually crumbless.

Accordingly, it is noted that the product produced by this invention eliminates many of the processing steps hitherto practiced in the food industry in the production of a puffed food product.

In accordance with the present invention, raw food product material, such as cereal grains or legumes, are placed between opposing surfaces of a mechanical press. Typically the legumes which might be used to produce a product and in the use of the precess are natural seeds, such as peas, lentils, soy beans, chickpeas, and the like. Typical cereal grains which might be used are wheat, rice, barley, oats, corn, popcorn, millet, sorghum, and similar grains. These grains or seeds may be left in their natural state or ground. It has been found that use of the seeds in their natural state produce a mosaic pattern in the finished product which is characteristic of the seed size and shape. The seeds may also be ground to varying particle sizes. For instance, the seeds may be ground to a very fine powder or flour consistency; however, it is noted that a product formed from this fine ground product is somewhat more dense and does not present the attractive mosaic pattern normally associated with a product formed from a selection of particles which are larger or which constitute the entire unground seed. Accordingly, it has been found that the most desirable particle size to produce a puffed product involves the use of particles of about 0.033 to about 0.5 inches. This size range of raw material produces an attractive mosaic pattern, insures adequate puffing of the individual particles and produces a very palatable product.

Next, the press which may be a hydraulically operated press, commonly available on the market, squeezes the raw product between two surfaces. The press should be of sufficient strength to subject the product to relatively high pressures. It has been found that pressures should be no less than about 100 pounds per square inch. Application of pressures up to about 1,000 pounds per square inch has been found to produce very satisfactory product. The choice of pressure to be applied to a particular product will depend to some extent upon the desired characteristics of the end product. For instance, it has been found that application of the higher pressures to the food product will result in less time required to heat the product and thereby achieve the desired flavor and physical characteristics for the finished product.

The plates of the press do not completely close to contact each other but only close enough to apply the required pressure to the raw food product. In this way, wafers of varying thickness may be formed.

Very short cooking time is necessary to produce a finished product by the application of pressures in the range of 100 p.s.i. to 1,000 p.s.i. since it has been found that the time required to puff and cook the product is about 1 second to about 30 seconds. This puffing and cooking is accomplished by heating the raw material to temperatures of about 300° F. to about 700° F. while the raw material is subjected to the high mechanical pressures.

If temperatures in this range are used, in combination with pressures in the range of 100 p.s.i. to 1000 p.s.i., the product may be puffed and cooked or toasted in a time of about 1 second to about 30 seconds. The puffing occurs when the mechanical pressure on the heated raw material is suddenly released and the elevated temperatures of the food product causes expansion of the moisture in the food product, (which is preferably in the range of 6 to about 18 percent by weight), to expand thereby puffing the individual particles of raw material.

Experiments with various food products revealed that three of the variables; heat, time and pressure, may be varied in order to produce various characteristics in the product. For instance, if the higher pressures in the range of 1,000 p.s.i. are used and if temperatures near 700° F. are used to heat the product while it is squeezed under this pressure, the product was found to be cooked and acquire appropriate flavor characteristics in as little time as 1 second. On the other hand, when the raw food material was subjected to the same range of pressures, in the neighborhood of 1,000 p.s.i., and was heated to a low temperature in the 300° F. range, that it took about 20 seconds to achieve essentially the same characteristics.

The release of the mechanical pressure on the raw material was discovered to achieve another desirable result, namely, a cementing of the individual raw material grains or particles together. It was found that as the pressure is suddenly released from the raw material, the individual particles, whether they be the whole seed or ground particles, puffed and expanded to a considerable degree. The expanding particles contacted each other. When these particles contacted each other at elevated temperatures, they became cemented together very firmly. No ingredient was added to the raw material to accomplish this cementing action but it was observed that a very firm bond was created between the individual particles. Presumably the naturally occurring ingredients in the legumes and grains when elevated to the above-noted temperatures caused certain of the naturally occurring ingredients, protein and carbohydrate fractions, to act as a cementing agent or agents and as the individual particles were expanding due to the release of pressure, these naturally occuring ingredients of the particles formed a bond between particles to produce a puffed wafer of food product. It was found that the use of the lower pressures produced a product with somewhat less cohesive characteristics after puffing. The products puffed to a satisfactory degree and formed a satisfactory wafer; however, it was found that as the product was broken, the cemented bond between the individual particles seemed to have somewhat less strength than if the higher pressures were used to form the product. In some situations, it may be desirable to have a product with a weaker bond thus permitting the product to disintegrate in the mouth of the consumer when the product is eaten. On the other hand, if it is anticipated that the product will be subjected to severe handling conditions during marketing of the product, the higher pressures might be utilized in order to achieve a stronger bond and thereby prevent damage to the product in transit and handling. It was found during the course of examination of a number of raw materials that a compromise of optimum finished characteristics could be achieved if a raw food material having a particle size range of about 0.033 to about 0.5 inches was subjected to pressures in the range of 800 to about 900 p.s.i. for a period of about 4 to 15 seconds. It was then found that most of the temperatures in the range of about 300° F. to about 700° F. produced a product of a broad range of satisfactory characteristics.

Temperatures in the range of 300° F. to 700° F. used to process the food product are rather high. Accordingly, some flavor characteristics may be lost from the food products which are puffed due to evaporation of the volatile flavoring elements. A reduction of the loss of these flavoring characteristics was found possible by rapidly cooling the puffed wafer immediately after the release of pressure for puffing the product. While some of the volatile flavoring materials were unavoidably evaporated, it was found that rapid application of cooling to the puffed wafer resulted in a substantial reduction of the loss of these ingredients. The cooling produced a finished food product having substantially stronger flavor characteristics. On the other hand, development of a subtle flavor may be the desired end characteristic in which case no cooling of the puffed wafer should take place to permit these volatile flavoring characteristics to evaporate to produce the moresubtle flavor in the finished product.

One of the outstanding characteristics of this product was discovered to be the relatively crumbless nature of the product when it is broken or eaten by the consumer. When a bite is taken from a wafer sized product, there is no tendency for the product to crumb in the sense that a cookie or similar food product will crumb. The cementing which occurs between the individual particles of the raw material is credited with providing this anti-crumb characteristic. Further, no additional toasting or cooking step is necessary since the puffing tends to tenderize the finished product for immediate consumption and the high temperatures applied to the food product as it is pressed between the mechanical surfaces of a press tend to toast the product to enhance the flavor of the raw material. In the case of a legume, such as chickpeas, the product flavor may be characterized as a nutty flavor.

A more complete understanding of the product and process may be achieved by reference to the following examples of specific legumes and cereal grains which were processed according to the invention.

EXAMPLE I

Raw food material in the form of long grain rice was deposited between the metal plates of a hydraulically operated press. The rice was then squeezed between the mechanical surfaces of the press under a force of 900 pounds per square inch for a period of 9 seconds. During the time that the rice was squeezed, it was heated through heating elements in the surface of the mechanical surfaces of the press, to a temperature of 468° F. When the pressure on the press was rapidly released, the rice immediately puffed and the individual grains became cemented together to form a wafer having a mosaic pattern. The product was found to have a satisfactory puff which took the form of a wafer having individual grains cemented together. The product took on a toasted flavor with some of the characteristics of a nut-like flavor.

EXAMPLES II THROUGH XII

The following individual examples were processed exactly in the same manner as Example I except that the time that the individual products were squeezed between the mechanical surfaces of a press varied as noted in the individual lists here below.

| Product type | Process time |
|---|---|
| 1. Wheat | 12 seconds |
| 2. Barley | 12 seconds |
| 3. Oats | 12 seconds |
| 4. Peas | 6 seconds |
| 5. Lentils | 4 seconds |
| 6. Corn | 12 seconds |
| 7. Popcorn | 9 seconds |
| 8. Millet | 10 seconds |
| 9. Sorghum | 10 seconds |
| 10. Lime treated corn | 10 seconds |
| 11. Soybeans | 8 seconds |
| 12. Chickpeas | 8 seconds |

Each of the products was found to have a satisfactory puff with a toasted flavor. The legume products tended to have a stronger nut-like flavor than the cereal grains. Each of the products developed a mosaic pattern characteristic of the original shape of the raw material. In each case, the finished product took the form of a wafer wherein the individual seeds or particles were securely cemented together during the puffing operation.

It is to be understood that any number of variations may be prepared by those skilled in the art which will fall within the spirit and scope of the above illustrations and examples.

The embodiments of the invention in which an exclusive property or privilege is claimed are defined as follows:

1. A process for forming a wafer of puffed food product which comprises the steps of depositing a quantity of individual particles of raw food material selected from the group consisting of cereal grains and legumes between movable opposing surfaces, said particles having sufficient moisture present to permit puffing of said particles, squeezing the particles between the opposing mechanical surfaces to subject the particle to a pressure of not less than 100 p.s.i., heating the particles to a temperature of from 300° F. to about 700° F. for not more than 30 seconds while the particles are being squeezed between opposing surfaces and then rapidly releasing the pressure on the particles to cause the individual particle to expand and become cemented together to form a wafer of puffed food product.

2. A process in accordance with claim 1 which further includes the step of rapidly cooling the wafer of puffed food product immediately after it becomes puffed to reduce the loss of volatile flavoring ingredients in the puffed food product.

3. A process in accordance with claim 1 in which the moisture content of the individual particle is from 6 to 18 percent by weight, in which the particles are squeezed at pressures of 100 p.s.i. to about 1,000 p.s.i. for a period of from 1 to about 30 seconds, during which the particles are heated to a temperature of from 300° F. to about 700° F.

4. A process in accordance with claim 1 in which the particles have a size range of 0.033 inches to about 0.5 inches.

5. A process for forming a wafer of puffed food product which comprises the steps of depositing a quantity of individual particles of raw food material selected from the group consisting of cereal grains and legumes between movable opposing surfaces, said particles having sufficient moisture present to permit puffing of said particles, squeezing the particles between the opposing surfaces to subject the particles to a pressure of 800 p.s.i. to about 900 p.s.i., heating the particles to a temperature of 300° F. to about 700° F. for a period of not more than 4 to 15 seconds while the particles are being squeezed between opposing surfaces and then rapidly releasing the pressure on the particles to cause the individual particles to expand and to become cemented together to form a wafer of puffed food product.

6. A process in accordance with claim 5 in which the moisture content of the individual particles of raw food material is 6 to 18 percent by weight and in which the particle size is from 0.033 inches to about 0.5 inches.

7. A product produced by the process of claim 1.

* * * * *